(12) United States Patent
Sheth et al.

(10) Patent No.: US 6,405,106 B1
(45) Date of Patent: Jun. 11, 2002

(54) ENHANCED VEHICLE CONTROLS THROUGH INFORMATION TRANSFER VIA A WIRELESS COMMUNICATION SYSTEM

(75) Inventors: Devang G. Sheth, West Bloomfield; Sharanjit Singh, Novi, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/631,595

(22) Filed: Aug. 3, 2000

(51) Int. Cl.[7] .................... G06F 19/00; G06F 17/00; G06F 9/00; G05D 1/00
(52) U.S. Cl. .............. 701/1; 701/24; 701/29; 701/200-215; 705/5; 705/417; 705/418; 705/400; 342/457; 342/357.01; 342/357.09; 340/990; 340/989; 340/995; 340/994; 455/557; 455/550
(58) Field of Search ................. 701/200–215, 701/1, 29, 24; 705/5, 417, 418, 400; 342/457, 357.01, 357.09; 340/990, 989, 995, 994, 988; 455/557, 550

(56) References Cited

U.S. PATENT DOCUMENTS

| | | | | |
|---|---|---|---|---|
| 5,608,412 A | * | 3/1997 | Welles, II et al. | 34/457 |
| 5,794,164 A | * | 8/1998 | Beckert et al. | 701/1 |
| 5,945,985 A | * | 8/1999 | Babin et al. | 345/302 |
| 5,946,687 A | * | 8/1999 | Gehani et al. | 707/10 |
| 6,028,537 A | * | 2/2000 | Suman et al. | 340/988 |
| 6,107,944 A | * | 8/2000 | Behr et al. | 340/995 |
| 6,226,529 B1 | * | 5/2001 | Bruno et al. | 455/557 |

* cited by examiner

*Primary Examiner*—William A Cuchlinski, Jr.
*Assistant Examiner*—Ronnie Mancho
(74) *Attorney, Agent, or Firm*—Christopher DeVries

(57) ABSTRACT

A vehicle control system method and apparatus including a mobile application service provider communicating over a wireless communication network, a mobile station communicating with the mobile application service provider over the wireless communications network, and a vehicle controller communicating with the mobile station via an automotive communications network, and where the mobile application service provider accesses process variables on a computer network and transfers the process variables to the mobile station to be used by the vehicle controller for vehicle control.

20 Claims, 1 Drawing Sheet

ENHANCED VEHICLE CONTROLS THROUGH INFORMATION TRANSFER VIA A WIRELESS COMMUNICATION SYSTEM

TECHNICAL FIELD

The present invention relates to vehicle controls. More specifically, the present invention relates to a method and apparatus of transferring information to a vehicle, via a wireless communication system, to provide data to the vehicle controls.

BACKGROUND OF THE INVENTION

In today's competitive automotive market, there is increasing pressure to reduce costs and provide value for consumers. Vehicle production numbers for a particular automotive manufacturer may easily reach into the millions. A reduction in manufacturing costs of a few cents or dollars per vehicle can lead to savings of a few thousand to millions of dollars for an automotive manufacturer. Accordingly, there are large incentives to reduce the number of or remove even the most inexpensive components in a vehicle.

Presently, automotive companies integrate numerous sensors into a vehicle control system to control the climate of the vehicle, modify engine control parameters, or other similar functions. For example, a humidity sensor or barometric pressure sensor can be used to improve the performance of various powertrain control systems such as spark control, air fuel ratio, exhaust gas recirculation, etc. These sensors add significant cost to the assembly of a vehicle.

The development of wireless telecommunications has enabled the provision of mobile application services to vehicles by mobile application service providers such as GM OnStar®. Such services include providing call-in service for a global positioning system, automatic notification of supplemental inflatable restraint activation, activation with dispatch of emergency services, etc. The present invention utilizes wireless telecommunications to transfer data or process variables to a vehicle to be used by vehicle control systems.

SUMMARY OF THE INVENTION

In accordance with the teachings of the present invention, a method and apparatus is provided for using a wireless telecommunications system such as a cellular phone system or a satellite communication system to provide data that replaces data generated by sensors physically or electrically coupled to the control systems of a vehicle. By replacing sensors with data transferred from a wireless communication system, hardware is eliminated and costs are reduced.

In the method and apparatus of the present invention, embedded mobile stations such as cellular phones, radio transceivers, or satellite communication devices are provided in a vehicle to communicate to a mobile application service center (MASC) such as utilized by the OnStar® service. The embedded mobile station is equipped with a global positioning system (GPS) receiver which can accurately predict the current position of the vehicle. The embedded mobile station is also connected to an automotive communication network such as IES-CAN, GMLAN, J1850, and J1939 to communicate with an engine control module (ECM), a powertrain control module (PCM), a transmission controller, a body computer, or other vehicle controller.

The GPS located in the embedded mobile station will provide location information to the MASC. The MASC will then query an information source such as the worldwide web/Internet for data or process variables to be used by a vehicle control system. The data or process variable in the preferred embodiment of the present invention include environmental or weather condition data corresponding of the location of the embedded station. In alternate embodiments of the present invention, a proprietary system of networked computers with environmental sensors may communicate with the MASC to provide environmental and weather condition data. The environmental data will then be transferred to the embedded mobile station, via the wireless communication system, and then to the vehicle systems such as the ECM and PCM. For example, humidity and temperature information may be transferred from the MASC to the embedded mobile station and then to the ECM to be used as a process variable in controlling the engine functions such as spark control and air/fuel ratio. The humidity and temperature data may further be used for environmental controls to ensure operator comfort.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
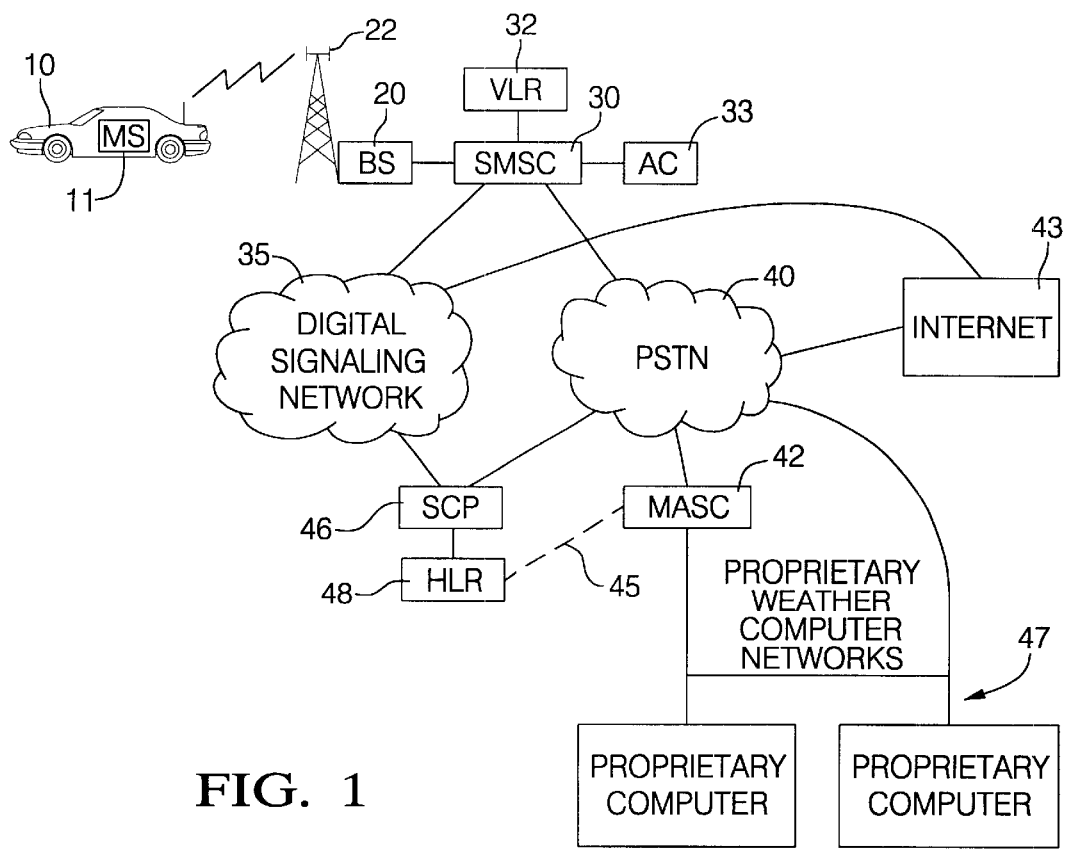
FIG. 1 is a schematic diagram of a mobile application service network providing mobile application services to mobile stations in vehicles through a wireless telecommunications network.

FIG. 1 shows a network model of a mobile application service network using a wireless telecommunications network. The model shows function entities in a manner consistent with specification ANSI/TIA/EIA-41 ("IS-41"); the actual apparatus used is known to those skilled in the art, except as described herein.

Referring to FIG. 1, a vehicle 10 is mobile—either self-propelled (a motor vehicle) or propelled by another (a trailer). The vehicle 10 is provided with an embedded mobile station (MS) 11 capable of two-way communication via electromagnetic waves such as radio waves with a base station (BS) 20, having an antenna 22, or a satellite. The MS 11 communicates with the BS 20 within a limited coverage area around the BS 20, as well as any other base stations as it moves through their limited coverage areas. When a satellite is used to communicate with the MS 11, the coverage area will vary to reflect the satellite coverage. The BS 20 is connected by land communication lines to a mobile switching center (MSC) which, because it is shown as currently serving MS 11, will be referred to as the serving mobile switching center (SMSC) 30.

The BS 20 (or satellite and satellite base station) and the SMSC 30 are operated by a wireless telecommunications service provider in a defined geographic service area. The SMSC 30 is part of a wireless telecommunications network providing mobile stations such as the MS 11 communication capability with other stations, either mobile or stationary. In the preferred embodiment, the MS 11, BS 20, and SMSC 30 preferably operate in the cellular license band, but they are not limited to such operation; the personal communications (PCS) band and others are alternatives.

In addition to the BS 20 and SMSC 30, the wireless telecommunications network comprises at least a digital signaling network 35 (ISDN, SS7, X-25) capable of carrying IS-41 data messages and a public switched telephone network (PSTN) 40 capable of carrying voice and data transmissions. The digital signaling network 35 and PSTN 40 extend over a large geographical area—potentially all of North America or the globe—over which mobile application services are provided to moving vehicles. The SMSC 30 is further connected to a visitor location register (VLR) 32 containing temporary location, status, and service information concerning the MS 11 and other mobile stations registers as visitors with the SMSC 30. The SMSC 30 may optionally be connected to an authentication center (AC) 33 for performing authentication functions relative to mobile stations, including the MS 11, attempting access thereto.

The MS 11 is a subscriber to a mobile application service provider having a mobile application service center (MASC) 42 connected to the wireless telecommunications network via the PSTN 40. The mobile application service provider is a business concern that provides mobile application services to vehicles via the wireless telecommunications network. These mobile application services may include vehicle operator call-in services such as providing GPS determined vehicle location data or providing data acquisition such as downloading weather or environmental data. The provider of these application services may or may not be also a provider of a telecommunications network in the network itself. In the preferred embodiment, the mobile application service provider is a manufacturer of vehicles and provides these services, as well as the embedded mobile station used in providing the data and services, to the purchaser and other operators of those vehicles.

The MASC 42 is operated by the mobile application service provider and includes communications stations staffed by operators who receive calls to MASC 42 from MS 11 and other mobile stations. The MASC 42 also communicates with information data providers, government and emergency service providers, and others in order to provide the mobile application services requested or required by the operators and systems of the vehicle 10 and other vehicles having embedded mobile stations.

The mobile application service provider also provides and maintains a home location register (HLR) 48 connected via a service control point (SCP) 46 to the digital signaling network 35 and the network PSTN 40. HLR 48 contains subscriber profile data for all embedded mobile stations, the data including such information as the MS 11 location, subscriber status, call restrictions and directory numbers. If more than one physical home location register is provided, each one will contain the basic subscriber data, including call restrictions for all subscribers. A separate communication link, indicated by dashed line 45 in FIG. 1, may be provided between the HLR 48 and the MASC 42 to facilitate data flow in providing enhanced mobile application services.

Figure 2:
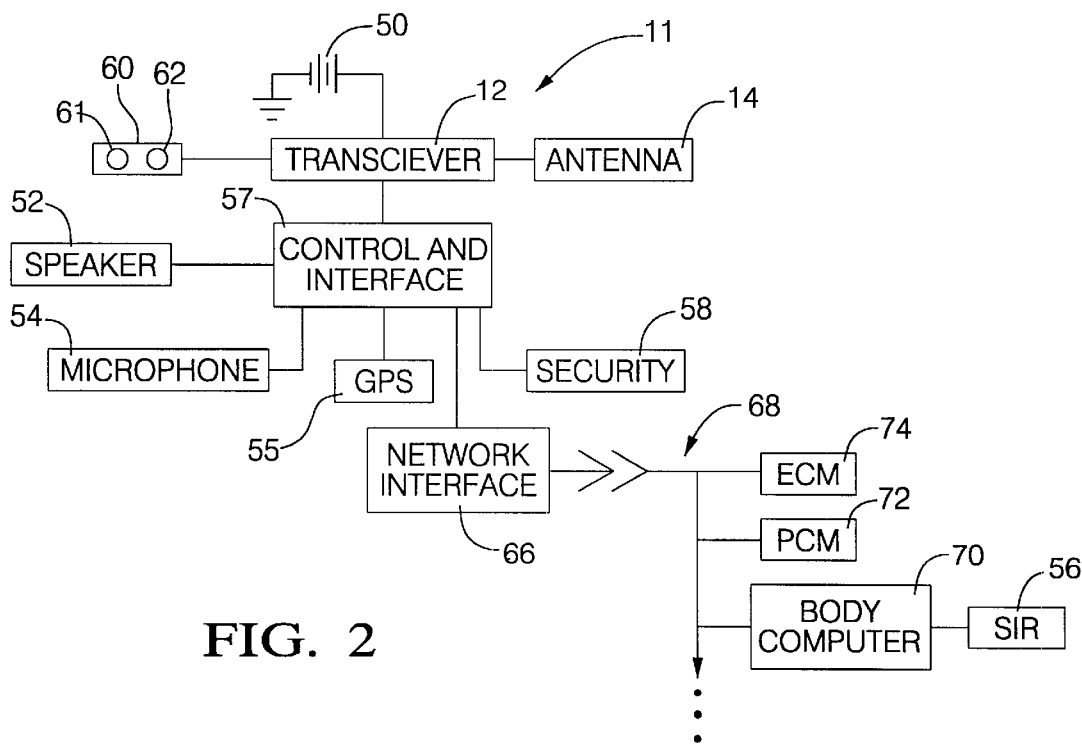
FIG. 2 is a block diagram of a mobile station for use in the network of FIG. 1.

The MS 11 is shown with its vehicle interfaces in FIG. 2. The heart of the MS 11 is transceiver 12, which is manufactured by or to the specifications of the mobile application service provider and is provided by the mobile application service provider to be installed as an embedded unit within the vehicle 10. It may be installed by the mobile application service provider itself, by an automotive dealer, or by another installer on behalf of the mobile application service provider. The word "embedded" means that it is installed in the vehicle and intended for use in the provision of application services provided to the vehicle, and further means that it is a subscriber of mobile application services provided. In the preferred embodiment, the transceiver 12 is technically capable of operation in either the "A" or the "B" portions of the cellular band, but mobile stations using the PCS band and satellite transmissions are considered within the scope of the present invention. The transceiver 12 is provided with identification data comprising a nongeographic, dialable, mobile identification number (MIN) and an equipment serial number (ESN), and this data is stored in the HLR 48 as part of its profile data.

The transceiver 12 is provided with electric power from a DC electric power supply 50, which may be the normal vehicle DC power supply or a supplemental DC power supply, and is connected by an RF connection to antenna 14. A control and interface microprocessor/microcontroller 57 provides interfacing and coordination with vehicle systems and accessories. For example, a speaker 52 and microphone 54 are used for voice communication to and from transceiver 12. Other accessories and monitored vehicle system may provide digital data through microcontroller 57 to transceiver 12. For example, GPS receiver 55 which includes an antenna, not shown, provides vehicle position information used by MASC 42 to locate the vehicle 10. Supplemental inflatable restraint (SIR) 56 is linked to a body computer 70 or other computer/controller communicating on an automotive communication network 68 linked to the microcontroller 57, via a network interface 66. The network interface 66 provides the MS 11 with the ability to transfer information to the various controllers on the vehicle such as an engine control module (ECM) 74, a powertrain control module (PCM) 72, and the body computer 70. The automotive communications network 68 network is preferably GMLAN but may comprise any known automotive communications network. The embedded mobile station described in this paragraph may be essentially the same as already used in the commercially-available GM OnStar® system.

The ECM 74, PCM 72, and/or body computer 70 require numerous sensor inputs to control various devices in the vehicle 10. These sensor inputs are traditionally located in the vehicle 10. The present invention enables sensors to be eliminated from the vehicle 10 by providing process variable data to replace the sensor inputs, reducing the cost of the vehicle 10. For example, humidity, barometric pressure, and temperature data are used in various engine control algorithms and are typically provided by sensors hardwired to the ECM 66. In the present invention, the MASC 42 utilizes the GPS 55 on the vehicle 10 to determine the vehicle position, and the MASC 42 accesses the worldwide web/Internet 43 to query particular weather Internet sites for the present environmental conditions for the location of the vehicle 10. In one embodiment of the present invention, the MASC 42 will periodically communicate on the Internet 43 to access environmental data or weather conditions from government or commercial weather Internet sites, via a crawler. The MASC 42 then transmits the environmental data, via the PSTN 40, the SMSC 30, the BS20, and the antenna 22 to the MS 11 in the vehicle 10.

The transceiver 12 of MS 11 transfers the data to the microcontroller 57. The microcontroller 57, via the network interface 66, transfers the data to the automotive communications network 68 where the ECM 74, PCM 72, or body computer 70 can access the data for use in control algorithms for the vehicle 10. The present invention eliminates the need for costly environmental sensors by using environmental data already existing on the Internet 43 or other computer networks and transfers the data to the controllers of the vehicle 10, via a wireless network.

In an alternate embodiment, the MASC 42 will communicate within a proprietary computer network 47 of weather-sensing systems to provide environmental process data.

While this invention has been described in terms of some specific embodiments, it will be appreciated that other forms can readily be adapted by one skilled in the art. Accordingly, the scope of this invention is to be considered limited only by the following claims.

What is claimed is:

1. A vehicle control system comprising:
    a mobile application service provider communicating over a wireless communication network;
    a mobile station communicating with said mobile application service provider over said wireless communications network;
    a vehicle controller communicating with said mobile station via an automotive communications network; and
    wherein said mobile application service provider accesses process variables on a computer network and transfers said process variables to said mobile station to be used by said vehicle controller for air fuel ratio control in an engine.

2. The vehicle control system of claim 1 wherein said wireless communication network is a cellular radio network.

3. The vehicle control system of claim 1 wherein said wireless communication network is a satellite communication system.

4. The vehicle control system of claim 1 wherein said vehicle controller is an engine control module.

5. The vehicle control system of claim 1 wherein said vehicle controller is a powertrain control module.

6. The vehicle control system of claim 1 wherein said vehicle controller is a body computer.

7. The vehicle control system of claim 1 wherein said automotive communication network operates under the GMLAN protocol.

8. The vehicle control system of claim 1 wherein said automotive communications network operates under the J1850 protocol.

9. The vehicle control system of claim 1 wherein said process variables may be selected from the group comprising humidity, barometric pressure, or temperature.

10. The vehicle control system of claim 1 wherein said computer network is the Internet.

11. The vehicle control system of claim 1 wherein said computer network is a proprietary computer network.

12. A method of providing data to a vehicle controller comprising:
    accessing data in a computer network;
    transmitting data to a transceiver in a vehicle via a wireless communications network; and
    transferring data to the vehicle controller via an automotive communications network, wherein said vehicle controller utilizes said data as a process variable in an air fuel ratio control algorithm.

13. The method of claim 12 wherein the step of accessing data in a computer network comprises accessing the Internet.

14. The method of claim 13 further comprising the step of providing a crawler to access data on Internet sites.

15. A method of providing a process variable to a vehicle controller comprising:
    measuring the process variable with a sensor;
    converting the measured process variable to a digital value;
    transferring said digital process variable value to a computer network;
    accessing said digital process variable from said computer network;
    transmitting said digital process variable value to a transceiver in a vehicle via a wireless communications network;
    transferring said digital process variable value to the vehicle controller from said transceiver via an automotive communications network; and
    controlling a spark control algorithm in a vehicle engine with said process variable.

16. The method of claim 15 further comprising the step of using said digital process variable value to control an engine in the vehicle.

17. The method of claim 15 further comprising the step of using said digital process variable value to control a transmission in the vehicle.

18. The method of claim 15 further comprising the step of using said digital process variable value to control environmental controls in the vehicle.

19. A vehicle control system comprising:
    a mobile application service provider communicating over a wireless communication network;
    a mobile station communicating with said mobile application service provider over said wireless communications network;
    a vehicle controller communicating with said mobile station via an automotive communications network; and
    wherein said mobile application service provider accesses process variables on a computer network and transfers said process variables to said mobile station to be used by said vehicle controller for spark control in an engine.

20. A method of providing data to a vehicle controller comprising:
    accessing data in a computer network;
    transmitting data to a transceiver in a vehicle via a wireless communications network; and
    transferring data to the vehicle controller via an automotive communications network, wherein said vehicle controller utilizes said data as a process variable in a spark control algorithm.

* * * * *